April 26, 1932.  C. D. COLLINS  1,855,938
DUSTING APPARATUS
Filed Dec. 17, 1928
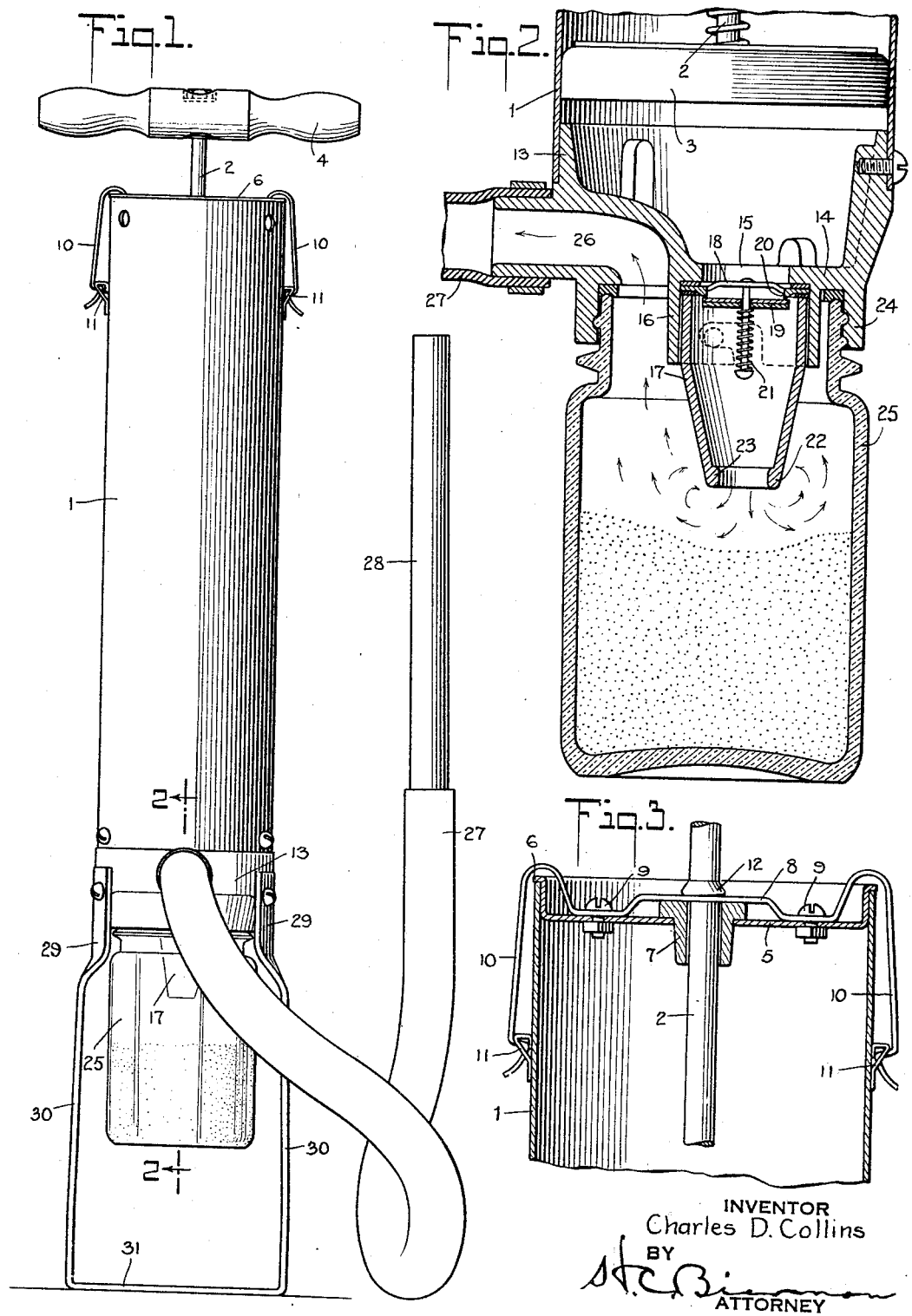
INVENTOR
Charles D. Collins
BY
ATTORNEY Patented Apr. 26, 1932

1,855,938

UNITED STATES PATENT OFFICE

CHARLES D. COLLINS, OF NEW YORK, N. Y., ASSIGNOR TO AMERICAN CYANAMID COMPANY, OF NEW YORK, N. Y., A CORPORATION OF MAINE

DUSTING APPARATUS

Application filed December 17, 1928. Serial No. 326,677.

This invention relates to a device for ejecting or dusting powdered material by means of air.

The principal objects of the invention are to provide a simple, compact device which may be readily operated in an efficient manner and which will adapt itself to ease of manufacture.

While the invention is primarily adapted for the distribution of a dusting material in the form of a fumigant, yet obviously the invention is not to be limited thereto as any desired powdered or dust material may be conveniently distributed by the device of this invention.

To this end the invention contemplates the provision of air supplying means conveniently shown in the form of a pump, to the lower portion of the barrel of which is secured a fixture, carrying a readily detachable dusting material container at the bottom thereof. The fixture itself is provided with a central apertured wall through which the air moves under impulse of the pump plunger, and the bottom of this wall carries an integral depending skirt. Within the skirt there is detachably held a nozzle and between the nozzle and the wall of the fixture is located a one-way valve, preferably spring actuated to prevent the movement of air and entrained dusting material into the pump barrel.

It has been found that this nozzle may conveniently take the form of a tapered element having the tip thereof formed with an inwardly projecting flange. This flange causes turbulence of the air passing through the nozzle and serves to cause a maximum amount of dusting material to be picked up by the air passing therethrough. The air and entrained dusting material is ejected through a port in the side of the fixture which may contain a perforated pipe as in other dusters, and a flexible hose or other device may be provided for directing the dusting material to the desired point.

The invention further consists in the novel arrangement, combination and construction of parts more fully hereinafter described and shown in the accompanying drawings.

In these drawings:

Fig. 1 is a side view of a device embodying the invention.

Fig. 2 is a sectional elevation along the line 2—2 of Fig. 1.

Fig. 3 is an enlarged detail of the cap on the pump barrel and associated parts.

Referring to the embodiment illustrated I have shown a pump barrel at 1 to comprise a cylindrical element of the desired size within which operates the usual rod 2 carrying a plunger 3 thereon and having a handle 4. Within the top of the pump barrel 1 a dished cap 5 is provided which seats as at 6 on the top rim of the pump barrel. The rod 2 passes through an aperture in the cap 5 and a bushing 7 of wood or other desired materal is provided between the rod and the cap. A spring clip 8 overlying the bushing 7 is detachably secured to the cap as by means of bolts 9 and then is bent over the top of the pump barrel and down the sides thereof to form fingers 10 which detachably engage clips 11 on the barrel side. An enlargement 12 is provided on the rod 2 to prevent the plunger from moving too far down in the barrel. To the bottom of the pump barrel a fixture 13 is secured which effectively closes the barrel. This element 13 has a central wall 14 containing an aperture 15 therein through which air moves under impulse of the plunger 3.

On the bottom of the wall 14 there is formed a depending skirt 16 into which is detachably secured a nozzle 17 as by means of a bayonet joint connection. Between the top of the nozzle 17 and the bottom of the wall 14 there is located a valve frame work 18 having a valve proper 19 movable upwardly against the seat 20 under impulse of the spring 21. It will thus be seen that when the plunger moves downwardly the valve 19 will be unseated and air will be permitted to pass through the nozzle, but the seating of this valve prevents backward movement of the air. Suitable gaskets are provided between the valve framework and the fixture as well as between the valve framework and the nozzle.

The nozzle 17 is provided with a tapered portion which terminates in a restricted tip 22 on the interior of which is located an inwardly projecting flange 23. The presence of this flange causes turbulence of air as it passes through the nozzle and insures the picking up of a maximum amount of dusting material.

To an outer depending flange 24 on the fixture 13 there is detachably secured, as by coarse threads, a dusting material container 25 which may conveniently take the form of a glass jar although I do not wish to be limited to this instrumentality.

Above the jar 25 and at one side of the skirt 16 an exit port 26 is located through which the air and entrained dusting material is ejected into a flexible hose 27 and distributing tube 28.

Also secured to the fixture 13 and to the outside thereof is a strap 29 having side portions 30 which extend downwardly on each side of the container 25 and beneath the same to form a foothold 31. Sufficient room is provided between the foothold 31 and the bottom of the container 25 so that an operator may conveniently place his foot thereon when operating the device. It is to be noted that the strap forming the foothold at the same time effectively protects the glass container from accidental injury.

It will be seen that in the above instrumentalities there has been provided an assembly of an extremely simple construction which may be readily operated by an unskilled workman through the simple method of filling the container with dusting material, securing the same in place and then operating the pump handle. Due to the fact that a transparent container is used the operator may see at a glace when his supply of dusting material has become exhausted and replenish the same at will and with a minimum amount of delay and labor.

I claim:

1. A dusting device comprising a pump, a fixture secured to the bottom thereof, a depending skirt on the fixture, a nozzle detachably engaging the skirt, a one-way valve within the confines of the skirt and resting upon the nozzle, a container detachably held in the fixture, the nozzle projecting into the container, and an exit port in the fixture for air and entrained material.

2. A dusting device comprising a pump, a fixture secured to the bottom thereof, a container for dusting material secured to the fixture, a nozzle for directing air from the pump into the container and a foothold constituting a guard for the container attached to the fixture.

3. A dusting device comprising a pump, a fixture secured to the bottom thereof, a container for dusting material secured to the fixture, a nozzle for directing air from the pump into the container, and a foothold constituting a guard for the container attached to the fixture, comprising a strap extending down each side of the container and beneath the same.

4. A dusting device comprising a pump, a fixture secured to the bottom thereof, a container for dusting material secured to the fixture, a nozzle for directing air from the pump into the container, and a foothold constituting a guard for the container attached to the fixture comprising a strap extending down each side of the container and spaced from the bottom thereof a sufficient distance to enable an operator to place his foot between the strap and the container bottom.

5. A dusting device comprising a pump vertically arranged, a fixture at the bottom of the pump and secured thereto, a nozzle removably held in the fixture for receiving air from the pump and directing the same downwardly into a dust container detachably depending from the fixture, a one way valve removably held between the fixture and the nozzle, an exit port for air and entrained dust, and a foothold depending from the fixture and extending on two sides of the dust container and beneath the same a sufficient distance so that an operator may place his foot thereon to support the entire device during operation thereof.

In testimony whereof I have hereunto subscribed my name this 13th day of December, 1928.

CHARLES D. COLLINS.